March 31, 1964 W. FROEDE 3,127,095
APEX SEALING MEANS
Filed June 27, 1962 3 Sheets-Sheet 2

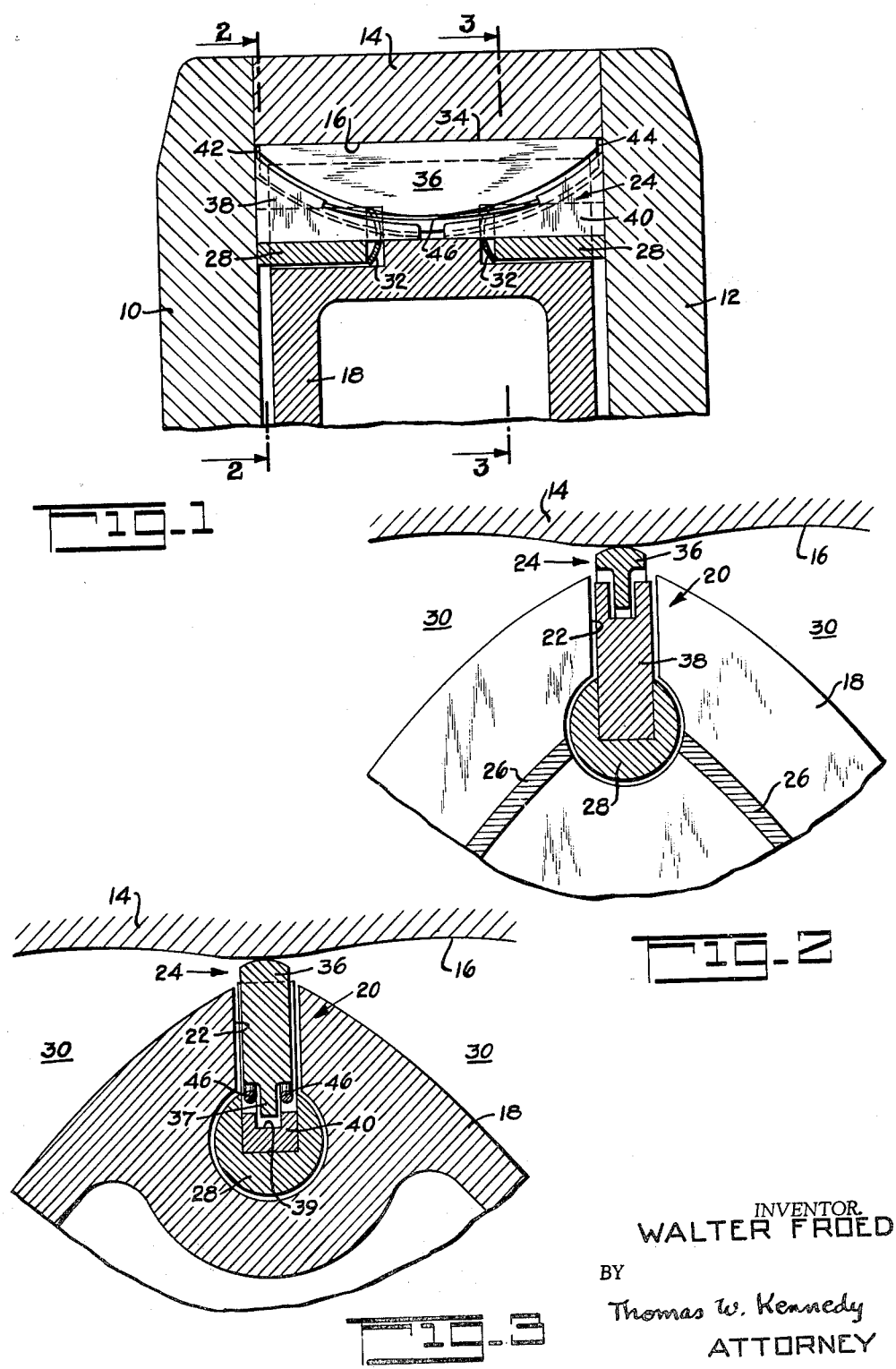

INVENTOR.
WALTER FROEDE
BY
Thomas W. Kennedy
ATTORNEY

March 31, 1964    W. FROEDE    3,127,095
APEX SEALING MEANS
Filed June 27, 1962    3 Sheets-Sheet 3

INVENTOR.
WALTER FROEDE
BY Thomas W. Kennedy
ATTORNEY

United States Patent Office 3,127,095
Patented Mar. 31, 1964

3,127,095
APEX SEALING MEANS
Walter Froede, Neckarsulm, Wurttemberg, Germany, assignor to NSU Motorenwerke Aktiengesellschaft, Neckarsulm, Germany, and Wankel G.m.b.H., Lindau (Bodensee), Germany
Filed June 27, 1962, Ser. No. 205,604
Claims priority, application Germany July 7, 1961
11 Claims. (Cl. 230—145)

The present invention relates broadly to the art of rotary mechanisms and is particularly directed to sealing means for such rotary mechanisms.

The invention is particularly useful in connection with rotary mechanisms similar to that disclosed in United States Patent Number 2,988,065, although as will become apparent, this invention is not limited to this specific type of rotary mechanism. In the following description the invention is described in relation to an internal combustion engine but the invention is also suitable for fluid pumps and fluid motors.

A rotary engine as disclosed in said patent comprises an outer body or housing having a cavity therein and an inner body or rotor disposed therein rotatable relative to the outer body, about an axis laterally spaced from, but parallel to the axis of said cavity. The inner body is journaled on an eccentric portion of a shaft which is co-axial with the outer body and journaled in bearings carried by the outer body end walls. The outer body has axially-spaced end walls and a peripheral wall interconnecting the end walls to form said cavity; the inner surface of the cavity peripheral wall having a multi-lobed profile which preferably is basically an epitrochoid. The inner body or rotor has end faces disposed adjacent to said outer body end walls for sealing cooperation therewith and has a peripheral surface with a plurality of circumferentially-spaced apex portions, each carrying a radially-movable seal or seal means for sealing engagement with the multi-lobed inner surface of the outer body peripheral wall to form a plurality of working chambers between the two bodies which vary in volume upon relative rotation of the two bodies. Each apex seal of the inner body runs axially, separating the adjacent working chambers, and is received within an outwardly-facing groove running axially from one end face to the other of the inner body at its associated apex portion on the inner body.

Prior combustion engines of this type have apex seals, which are one piece, rectangular in elevation view, and having square-cut ends. Because of the difference in longitudinal thermal expansion between the apex seals and the outer body, it is necessary to provide clearances or gaps between the ends faces of the apex seals and the flat inner surfaces of the adjacent outer body end walls. On occasion, the apex seals may bear first against one end wall and then against the other end wall of the outer body because of an axial play of the apex seals, so that the apex seals, which also have radial play being radially-movable, may tilt about their transverse axis, which may tend to jam the apex seals between the end walls.

Tilting about a transverse axis perpendicular to the side of the apex seal means can be avoided by providing a wider apex seal strip and a deeper apex groove. However, there may be two disadvantages in the use of such wider apex seal strip. Due to the greater mass of the wider strip it has a greater centrifugal force, which may increase the friction and wear on the strip outer edge and on the peripheral-wall inner surface. Further, a deeper groove lengthens the distance between the surface of the apex portion adjacent to the groove side walls and the cooling medium inside the hollow rotor, so that the apex portion surface may not be cooled as effectively as with a shallow groove.

On the other hand, the likelihood of jamming between the outer-body end walls can be avoided by providing a strip which is narrow relative to its length, and the groove receiving it shallower, so that the increase in projected length of the strip while tilted is less than the clearance between the strip and the end walls while axial-parallel. However, a narrow strip may tilt about its longitudinal axis, that is about its axis parallel to the rotor axis, because a narrow strip is less able to properly bear against a side wall of its groove. Accordingly, the aforementioned prior art form of apex seal strips may lead to poor sealing, and also jamming between the end walls which makes the strips unworkable and scars the sealing surfaces.

An object of the present invention comprises the provision of a rotary combustion engine in which a novel apex seal arrangement for the working chambers is provided to maintain continuous and improved sealing during engine operation.

Specifically, instead of providing apex seals of single-piece construction in bearing against the peripheral-wall inner surface and end walls of the outer body, this invention provides apex seals, each comprising a three-piece seal strip, in which the middle piece is radially movable and in bearing solely against the peripheral-wall inner surface, and each end piece of the apex seal strip is axially movable and in bearing solely against an adjacent outer-body end wall.

Thus, each of the improved apex seal means has three separate parts, each in independent sealing engagement with one of the three sealing surfaces of the outer body, so that tilting and displacement of one part of the apex seal means does not similarly affect the other two parts, thereby preventing jamming of the apex seal means and providing good sealing of the working chambers.

A further object of the invention is to prevent radial movement of the end parts of the apex seal means and to improve sealing of the working chambers by joining the end parts of the apex seal means with their cooperating axially-movable intermediate seal elements.

A further feature of the invention is the provision of spring means, received in the juncture portions between the parts of each apex seal means, for urging the middle part radially outward and the end parts axially apart in sealing engagement with the walls of the outer body.

Other objects of the invention will become apparent upon reading the annexed detail description in connection with the drawings in which:

FIGURE 1 is a partial, longitudinal, sectional view through a rotor apex portion and groove showing the apex seal strip in accordance with the invention;

FIGURE 2 is a cross-sectional view, as taken on line 2—2 of FIGURE 1;

FIGURE 3 is a cross-sectional view, as taken on line 3—3 of FIGURE 1;

Figure 4:
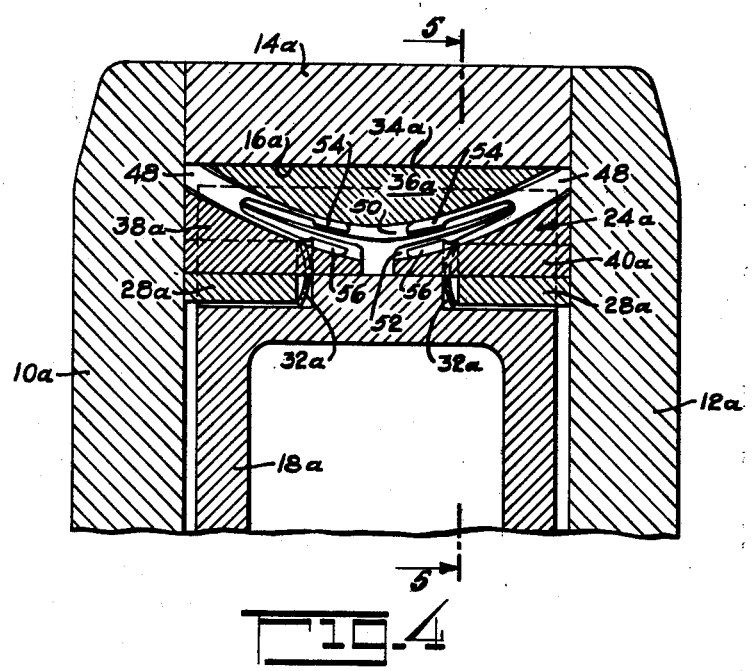
FIGURE 4 is a view similar to FIGURE 1, showing another form of apex strip, with the seal strip in section.

Referring to the drawings, the housing of a rotary combustion engine comprises spaced end walls 10 and 12, and a peripheral wall 14 disposed between and interconnecting said end walls to form a cavity therebetween.

The inner surface 16 of the peripheral wall 14 preferably has a multi-lobed profile in cross-section which is basically an epitrochoid.

Inside and eccentric to the housing is disposed an inner body or rotor 18, having a plurality of circumferentially-spaced apex portions 20 about its outer periphery. Each of said apex portions 20 has radially-movable apex seal means 24 received within a single outwardly-facing groove 22 extending in a direction parallel to the rotor axis from one end face to the other of the rotor 18 and urged radially outward into sealing engagement with the peripheral wall inner surface. The inner body 18 also has end faces having end-face seal means 26 and intermediate seal elements 28 disposed in sealing engagement with the end walls 10 and 12 to from a plurality of working chambers 30 which vary in volume upon rotation of the inner body 18 relative to the stationary outer body.

Each end of each apex seal means 24 is in sealing cooperation with an intermediate seal element 28. The bottom of each apex groove 22 has an enlarged cylindrical portion at each end of the groove, and an axially-movable intermediate seal element 28 is slidably fitted within such cylindrical portion and urged axially against the end wall 10 or 12 by gas pressure and by a spring 32. Between the intermediate seal elements 28, disposed at the rotor apex portions 20 on each end face of the rotor 18 adjacent to the rotor periphery, and associated with a working chamber 30, are end face seal strips 26, each of which extends from one intermediate seal element 28 to an adjacent element 28.

During rotation of the inner body 18, the apex seal means slide continuously along with their contact edges 34 in bearing against the inner surface 16 of the peripheral wall 14, and the intermediate seal elements 28 and end face seal strips 26 slide continuously along the flat inner surfaces of the end walls 10 and 12.

The engine so far described is substantially similar to the engine disclosed in the aforementioned United States Patent Number 2,988,065 and for additional description reference is made to said patent. The seal arrangement so far described is substantially similar to the seal arrangement disclosed in the aforementioned United States Patent Number 3,033,180 and reference is made to said patent.

In FIGURE 1, an apex seal means 24 is shown to be composed of three parts, including a middle part 36, which moves only in a radial direction for sealing engagement and bearing solely against the peripheral-wall inner surface 16, and two end parts 38 and 40, each of which moves only in an axial direction for sealing engagement and bearing solely against its adjacent outer-body end wall 10 or 12, so that the sealing functions of the apex seal means 24 are separately apportioned among the three parts 36, 38 and 40. Hence, an interruption of the sealing function of any one part does not affect the sealing function of the two remaining parts of the apex seal means.

The middle part 36 of the apex seal means 24 has a profile preferably which narrows in width at its axially-outward ends so that its ends are relatively narrow in width; and the longest dimension of the middle part 36 is at its radially-outward edge 34. The outer edge 34 of the middle part 36 is solely in sealing engagement with the peripheral-wall inner surface 16 and is also parallel to the axis of the rotor 18. The ends of the apex seal middle piece 36 are sufficiently narrow so that any increase in the length of the middle part 36 of the apex seal means 24 as projected on the axis of the rotor 18 resulting from tilting of the middle part 36 from a position parallel to the axis of the rotor 18, is quite small and less than the total width of the gaps 42 and 44 between the ends of the middle part 36 and the outerbody end walls. Hence, the apex seal means 24 cannot jam between the outer-body end walls 10 and 12.

The middle part 36 of the apex seal means is much wider in a radial direction at its middle portion and extends much deeper in its apex groove than at its axially-outward ends whereby the middle part 36 is guided radially and transversely by its contact with the side walls of its apex groove 22, so that the middle part 36 does not tilt about its longitudinal axis, that is about its axis parallel to the axis of the rotor 18. Hence, the apex seal means 24 maintains good contact with the side walls of its apex groove 22 and with the peripheral-wall inner surface 16 thereby providing good sealing.

Figure 6:
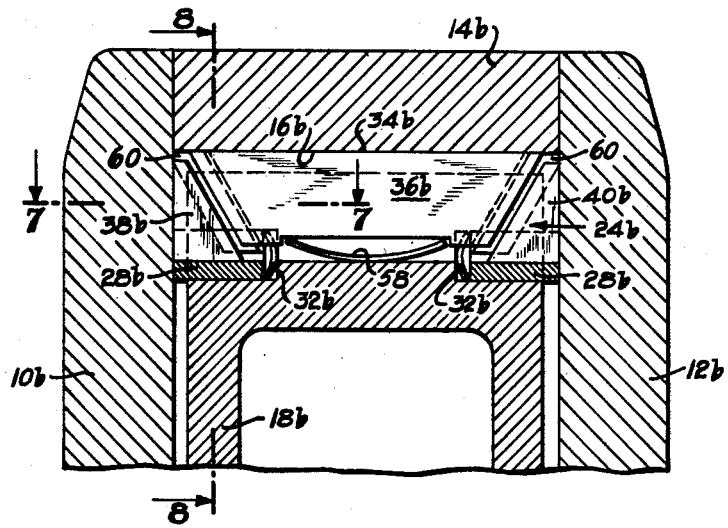
FIGURE 6 is a view similar to FIGURE 1, showing an additional form of apex seal strip.

The middle part 36 of the apex seal means 24 can have various types of a profile embodying narrow ends and a wide middle portion. Two types of profile usable for the middle part 36 are a trapezoid or a segment of a circle, with the latter preferred because of ease of manufacture. In the trapezoidal profile, as shown in FIGURE 6, the outer edge of the apex seal means corresponds to the long side of the trapezoid, and the slanted ends of the trapezoid converge radially-inwardly and adjoin the corresponding sides of the triangular end parts.

In the profile with the shape of a segment of a circle, as shown in FIGURES 1 and 4, the straight side of the circular segment corresponds with the outer edge 34 of the apex seal means 24, and its circular side adjoins correspondingly-shaped sides of the end parts 38 and 40 of the apex seal means 24.

In FIGURE 1, each of the end parts 38 and 40 of the apex seal means 24 has an axially-outward end face in sealing engagement with its adjacent outer-body end wall 10 or 12. The adjacent complementary surfaces of each end part 38 and 40 and the middle part 36 extend from a point between an outer corner of the middle part inwardly into the associated apex groove 22 and away from the adjacent end wall 10 or 12.

The end parts 38 and 40 are not radially movable and are only axially movable. Hence, the end parts 38 and 40 will not jam the middle part 36. For this purpose, each end part 38 or 40 is preferably joined with its associated intermediate seal element 28 preferably after the apex strip 24 is cut into three parts. The intermediate seal elements 28 are similarly axially-movable and not radially-movable and similarly in sealing engagement with their adjacent end walls 10 or 12. The associated parts 28 and 38 or 28 and 40 can be preferably pressed or snugly fitted together, or made as a single integral piece so that the associated parts have simultaneous axial movement. Hence, no special features are necessary on the end parts 38 and 40 to prevent radial movement and to provide for axial movement.

In FIGURE 1, tongue and groove joints are provided between each end part 38 or 40 and the middle part 36 of the apex seal means 24. Each end part 38 or 40 has an axially-inward surface and the middle part 36 has an axially-outward surface correspondingly shaped as a circular arc and facing each said end part 38 or 40. Each pair of associated facing surfaces are shaped to form a tongue and groove type of connection which as illustrated comprises a tongue 37 projecting from the middle part 36 into a groove 39 in each of the end parts 38 and 40. The tongue and groove connection minimizes leakage between the parts 36, 38, and 40, provides good sealing and allows each end part 38 and 40 and the middle part 36 to move in different directions for sealing different outer-body walls 10, 12 and 14.

In FIGURE 1, a gap 42 or 44 exists between each end face of the middle part 36 and the adjacent end wall 10 or 12, and is shown enlarged for the purposes of illustration being only about ten thousandths of an inch (0.010″) in average width by actual scale. This clearance is provided because the axial or longitudinal length of the middle part 36 thermally expands more than the length of the space between the end walls 10 and 12 of the outer body during operation. Thus, the middle part 36 is not clamped between the end walls 10 and 12 after thermal expansion.

Gas pressure from the adjacent working chamber 30 urges the middle part 36 radially outward in bearing against the peripheral-wall inner surface 16 and urges each combination of intermediate seal element 28 and its associated end part 38 or 40 axially outward in bearing against its adjacent outer-body end wall 10 or 12.

In FIGURE 1, spring means 32 and 46 are also provided to urge the parts 36, 38 and 40 in bearing. Spring means 46 urges the middle part 36 radially outward in bearing against the peripheral-wall inner surface 16 and a spring 32 urges each intermediate seal element 28 and its associated or joined end port 38 or 40 axially outward in bearing against the adjacent end wall 10 or 12.

Intermediate seal elements 28 are disposed within an inner-body apex groove 22 and an end thereof and are joined to the end parts 38 and 40 of the apex seal means 24. Thus, the intermediate seal elements 28 are not only in sealing engagement with the apex seal means 24, but each intermediate seal element 28 has simultaneous axial movement with its joined end part 38 or 40 of the apex seal means 24 whereby sealing is improved.

The intermediate seal elements 28 are slidably fitted within an enlarged cylindrical portion at each end of the apex groove 22. For greater clarity, the clearances between the inner surface of the apex groove cylindrical portion and the outer surface of its associated intermediate seal element 28 are greately exaggerated in all figures of the drawings. Accordingly each combination of an intermediate seal element 28 and its joined end parts 38 and 40 cannot make any radial movement but can move only in an axial direction. Thus, jamming of the apex seal means 24 is prevented. Preferably, the axial length of each seal element 28 is large relative to its diameter.

In FIGURES 2 and 3, the middle part 36 of the apex seal means 24 is shown midway between the side walls of the apex groove 22, which occurs at a time of equal gas pressure on the adjacent sides of the apex seal means 24. If the gas pressure in one working chamber 30 exceeds that in the adjacent working chamber 30, the middle part 36 will then move transversely and bear against a side wall of the groove 22. The clearances in the tongue and groove joint in FIGURE 1 are sufficiently large in a transverse direction to allow such transverse movement of the middle part 36. Hence, gas leakage is prevented across the apex seal means 24 between the working chambers 30.

As already stated, in FIGURE 1 a small gap 42 or 44 is left between each end of the midle part 36 and its adjacent end wall 10 or 12. To close these gaps 42a and 44a, a fill piece 48a as shown in FIGURE 4 is disposed at each end of the middle part 36a between the facing surfaces of the middle part 36a and each adjoining end part 38a and 40a and extending into the outer corners of the apex seal means 24a. In this way, a fill piece 48 fits within a pair of grooves 50 and 52 in each pair of facing surfaces as in FIGURE 4 in place of a tongue and groove joint between each pair of facing surfaces as in FIGURE 1. The parts of FIGURES 4 and 5 similar to those of FIGURES 1, 2 and 3 have the same reference numerals but with a subscript "a" added thereto.

Figure 5:
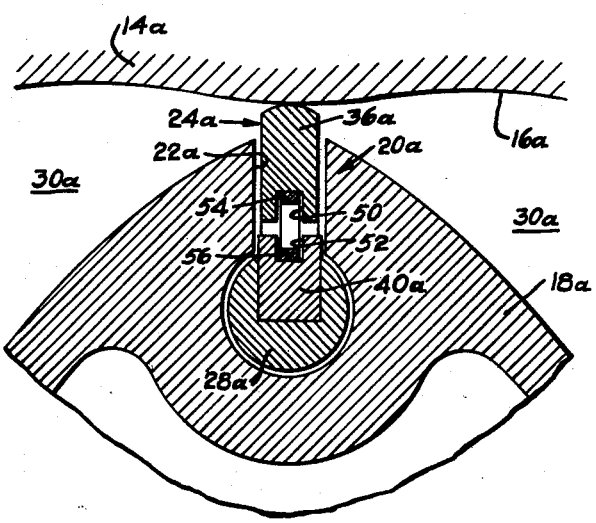
FIGURE 5 is a cross-sectional view, as taken on line 5—5 of FIGURE 4.

As shown in FIGURES 4 and 5, the middle part 36a and two end parts 38a and 40a of the apex seal means 24a and the intermediate seal elements 28a are substantially identical with the similar parts in FIGURES 1, 2 and 3, with the exception of the connections at their facing surfaces. At each pair of facing surfaces, there is a groove 50 in the middle part 36a and a groove 52 in each adjoining end part 40a. These grooves 50 and 52 receive a fill piece 48. Gas pressure in a working chamber 30a urges each fill piece 48 against the sidewalls of its grooves 50 and 52. Thus, the end parts 38a and 40a and the middle part 36a have a sealed connection along their facing surfaces.

The fill pieces 48 are outwardly movable and urged by gas pressure in an inclined direction toward the outer corners of the apex seal means 24a, that is in both a radially-outward and an axially-outward direction, and have radially-outward end faces in sealing engagement with the outer-body walls 10a, 12a, and 14a, so that the gaps 42a and 44a at both ends of the middle part 36a are sealed. Hence, even though the gaps 42a and 44a vary in size at different temperatures they are always filled and sealed by the fill pieces 48 whereby sealing is improved.

Spring action against the seal parts 36a, 38a and 40a preferably is supplied by compressible fill pieces 48 having resilient arms 54 and 56 as shown in FIGURE 4 for urging the adjoining facing surfaces apart whereby the middle part 36a is urged radially outward by spring arms 54 of the fill pieces 48 in bearing against the peripheral-wall inner surface 16 and the adjacent end parts 38a or 40a are urged at the same time axially apart by spring arms 56 of the fill pieces 48 in bearing against the outer-body end walls 10a and 12a. Hence, spring action of the arms 54 and 56 of the fill pieces 48 supplements the gas pressure and improves the sealing engagement of the three parts 36a, 38a and 40a of the apex seal means 24a with the three outer-body walls 10a, 12a, and 14a.

Figure 8:
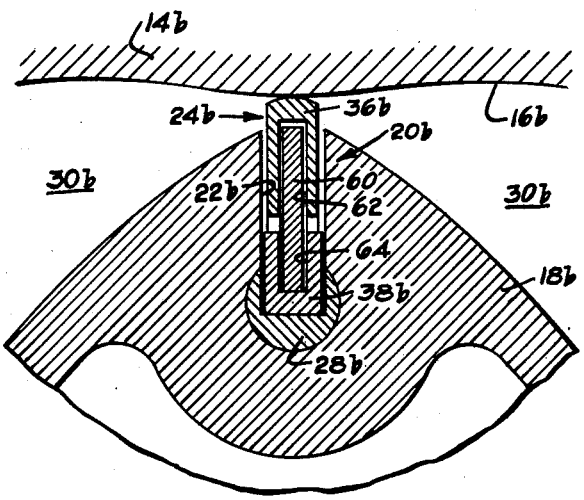
FIGURE 8 is a cross-sectional view, as taken along line 8—8 of FIGURE 6.
Figure 7:
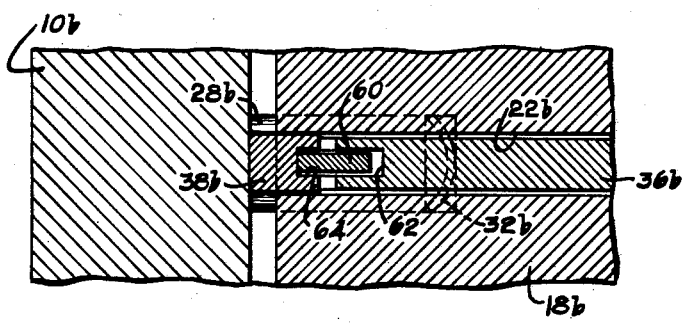
FIGURE 7 is a plan-sectional view, as taken along line 7—7 of FIGURE 6.

As shown in FIGURES 6, 7 and 8, another profile for the middle part 36b is a trapezoid in place of the profile of a circular segment as illustrated in FIGURES 1 and 4. The long side of the trapezoidal middle part 36b forms the outer edge 34b of the middle part 36b. Each end part 38b and 40b of the apex seal means 24b has a triangular profile with one side adjoining a slanted side of the trapezoidal middle part 36b. The parts in FIGURES 6, 7 and 8 corresponding to its parts in FIGURES 1, 2 and 3 have the same reference numerals but with a subscript "b" added thereto. The triangular end parts 38b and 40b are each joined to its associated intermediate seal element 28b to provide simultaneous axial movements, and to prevent radial and transverse movements. The trapezoidal middle part 36b is simularly urged in bearing radially outward against the peripheral-wall inner surface 16b by spring means 58. Hence, jamming of the middle part 36b between the end walls 10b and 12b is prevented.

A movable fill piece 60 is disposed between the facing surfaces and is received within a groove 62 in the middle part 36b and in a groove 64 in the end part 38b. The fill pieces 60 are outwardly movable in an inclined direction for sealing the gaps at the axial ends of the middle part 36b and have outer end faces in sealing engagement with the peripheral-wall inner surface 16b and the end walls 10b or 12b adjoining the outer corners of the apex seal means 24b. Hence, all gaps are sealed by the apex seal means preventing leakage between chambers.

Separate spring means 32b urge each intermediate seal element 28b and its joined end part 38b or 40b in an axial direction for sealing engagement of both parts 28b and 38b or 28b and 40b with an adjoining outer-body end wall 10b and 12b. Hence, the gas pressure is supplemented by springs 32b to urged the ends of the apex seal means 24b in good sealing contact with the outer body end walls 10b and 12b.

The various improvements of the invention provide improved sealing during engine operation, reduce the manufacturing cost of the seals and their cooperating parts, reduce maintenance on sealing surfaces and increase the life of the engine.

While I have described my invention in detail in its present preferred embodiment it will be obvious to those skilled in the art after understanding my invention that various changes and modifications may be made therein without departing from the spirit or scope thereof. I intend by the appended claims to cover all such modifications.

What is claimed is:

1. A rotary mechanism comprising an outer body having spaced end walls and a peripheral wall forming a cavity therebetween; an inner body disposed within said outer body for rotation relative to said outer body; said inner body having a plurality of movable apex seal means circumferentially spaced about its periphery, each received within an outwardly-facing groove extending from one end face to the other of said inner body; each said seal means having an outer edge in sealing engagement with the inner surface of the peripheral wall to form a plurality of working chambers between said bodies which vary in volume upon rotation of said bodies; each said apex seal means having a multi-part construction comprising two end parts being spaced axially apart and a radially-movable middle part between said end parts with the middle part having its outer edge in sealing engagement with the inner surface of said peripheral wall, the surface of each end part which is adjacent to a middle part surface being complementary to such middle part surface; and means in engagement with each end part for constraining each end part to solely axial movement and to cause engagement of the end face of each end part, with the adjacent end wall of said outer body.

2. A rotary mechanism as claimed in claim 1 and in which said apex-seal middle part has a profile similar to a segment of a circle with its straight side forming the outer edge of the middle part, the surface of each end part which faces the circular side of said apex seal middle part having a conforming circular arcuate profile and cooperating with said circular side.

3. A rotary mechanism as claimed in claim 1 and in which said apex-seal middle part has a trapezoidal profile with its long side forming the outer edge of the middle part and in which each said end part has a generally triangular profile with one side disposed adjacent to an end side of said middle part.

4. A rotary mechanism as claimed in claim 1 and in which said inner body has intermediate seal elements, each being axially-movable for sealing engagement with its adjacent outer-body end wall, with each said intermediate seal element received within an apex seal groove at an end thereof for sealing engagement with an adjacent end of said apex seal means.

5. A rotary mechanism as claimed in claim 4 and in which said apex-seal end part is joined to its associated intermediate seal element for simultaneous movement of the joined parts.

6. A rotary mechanism as claimed in claim 1 and in which the adjacent complementary surfaces of each end part and the middle part extend from a point adjacent to an outer corner of the middle part inwardly into the associated apex groove and away from the adjacent end wall.

7. A rotary mechanism as claimed in claim 6 and in which said adjacent complementary surfaces form tongue and groove joints.

8. A rotary mechanism as claimed in claim 6 and in which said apex seal means has a pair of movable fill pieces with each of said fill pieces disposed between an associated pair of said adjacent complementary surfaces and each fill piece having an end face in sealing engagement with at least one of the outer-body walls.

9. A rotary mechanism as recited in claim 8 and in which each said fill piece has resilient means urging its associated pair of complementary surfaces apart whereby the middle part is urged radially outward in bearing against the peripheral-wall inner surface and the end parts are urged axially apart in bearing against the outer-body end walls.

10. A rotary mechanism as claimed in claim 6 and in which said facing surfaces receive therebetween spring means urging said middle part in a radially outward direction in bearing against said peripheral-wall inner surface.

11. A rotary mechanism as claimed in claim 10 and in which said spring means simultaneously urge said end parts axially apart in bearing against the outer-body end walls.

References Cited in the file of this patent

UNITED STATES PATENTS

| | | |
|---|---|---|
| 394,242 | Byers | Dec. 11, 1888 |
| 1,582,922 | Freud | May 4, 1926 |
| 2,801,791 | Walter | Aug. 6, 1957 |
| 2,982,224 | Williams | May 2, 1961 |
| 2,988,065 | Wankel | June 13, 1961 |
| 3,064,880 | Wankel | Nov. 20, 1962 |

FOREIGN PATENTS

| | | |
|---|---|---|
| 495,091 | Belgium | Aug. 1, 1950 |
| 667,140 | Great Britain | Feb. 27, 1952 |
| 44,345 | Netherlands | Sept. 17, 1938 |